US 8,088,881 B2

United States Patent
No et al.

(10) Patent No.: US 8,088,881 B2
(45) Date of Patent: Jan. 3, 2012

(54) STORAGE STABLE MELAMINE-UREA-FORMALDEHYDE RESINS AND APPLICATIONS THEREOF

(75) Inventors: Byung Young No, Eugene, OR (US); William K. Motter, Eugene, OR (US); David M. Harmon, Eugene, OR (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 539 days.

(21) Appl. No.: 12/145,871

(22) Filed: Jun. 25, 2008

(65) Prior Publication Data

US 2009/0326185 A1    Dec. 31, 2009

(51) Int. Cl.
*C08L 61/00* (2006.01)
*C08L 61/24* (2006.01)
*C08G 12/00* (2006.01)
*C08G 12/38* (2006.01)

(52) U.S. Cl. ........ 528/256; 528/230; 528/503; 525/498; 524/597

(58) Field of Classification Search .......... 528/256, 528/230, 503; 525/498
See application file for complete search history.

(56) References Cited

U.S. PATENT DOCUMENTS

| | | | |
|---|---|---|---|
| 4,482,699 A | 11/1984 | Williams | |
| 4,536,245 A | 8/1985 | Shiau et al. | |
| 4,997,905 A | 3/1991 | Druet et al. | |
| 5,125,952 A | 6/1992 | Moore et al. | |
| 5,162,462 A | 11/1992 | Barthomieux et al. | |
| 5,681,917 A | 10/1997 | Breyer et al. | |
| 5,684,118 A | 11/1997 | Breyer et al. | |
| 6,369,171 B2 | 4/2002 | Dupre et al. | |
| 6,566,459 B1 | 5/2003 | Dopico et al. | |
| 2003/0096922 A1 | 5/2003 | Tutin et al. | |

OTHER PUBLICATIONS

Tohmura et al., "Influence of the Melamine Content in Melamine-Urea-Formaldehyde Resins on Formaldehyde Emission and Ured Resin Structure" J. Wood Sci (2001) 47:451-457.

*Primary Examiner* — Duc Truong

(57) ABSTRACT

Melamine-urea-formaldehyde resins may be prepared using processes including a first cook stage, a second cook stage, and a final addition wherein: the molar ratio of formaldehyde to urea and melamine (F:U+M) in the first cook stage is from about 2.0 to about 5.0; and the molar ratio of formaldehyde to urea and melamine (F:U+M) in the second cook stage is from about 1.5 to 3.0; and the molar ratio of formaldehyde to urea and melamine (F:U+M) in the final addition from about 0.4 to 0.70.

26 Claims, No Drawings

STORAGE STABLE MELAMINE-UREA-FORMALDEHYDE RESINS AND APPLICATIONS THEREOF

BACKGROUND OF THE INVENTION

1. Field of the Invention

The present invention relates to melamine-urea-formaldehyde resins (MUF resins) that are storage stable and applications thereof. The present invention particularly relates to methods of preparing storage stable MUF resins that are have low formaldehyde emissions and applications thereof.

2. Background of the Art

Formaldehyde is one of the most common chemicals used in industry. International production was over 46 billion pounds in 2004, according to the International Agency for Research on Cancer (IARC). It is well known as a preservative in medical laboratories, as an embalming fluid, and as a sterilizer. Formaldehyde's primary use is in the production of resins and as a chemical intermediate. Urea-formaldehyde and phenol formaldehyde resins are used in foam insulations, as adhesives in the production of particleboard and plywood, and in the treating of textiles.

Unfortunately, formaldehyde is considered undesirable in many applications. For example, the United States Occupational Safety and Health Administration, on its website, classifies formaldehyde as "reasonably anticipated to be a human carcinogen." Recently, the Associated Press reported that after resisting for years, the Federal Emergency Management Agency is setting strict new limits on formaldehyde levels in the mobile homes it buys for disaster victims to limit exposure of disaster victims to unhealthy levels of formaldehyde.

Responding to safety concerns, the agency said that it will take "extraordinary precautions" by buying trailers with formaldehyde emissions comparable to that of conventional housing. The requirement will start with a new three-year contract to purchase up to 3,300 units and a smaller contract for units intended for disabled residents.

It would be desirable in the art of making melamine-urea-formaldehyde resins to decrease the amount of formaldehyde released over time by the resins. It would also be desirable in the art if those resins were storage stable over time.

SUMMARY OF THE INVENTION

In one aspect, the invention is a process for preparing a melamine-urea-formaldehyde resin including a first cook stage, a second cook stage, and a final addition wherein: the molar ratio of formaldehyde to urea and melamine (F:U+M) in the first cook stage is from about 2.0 to about 5.0; the molar ratio of formaldehyde to urea and melamine (F:U+M) in the second cook stage is from about 1.5 to 3.0; and the molar ratio of formaldehyde to urea and melamine (F:U+M) in the final addition from about 0.4 to 0.70.

In another aspect, the invention is a melamine-urea-formaldehyde resin prepared using a method including a first cook stage, a second cook stage, and a final addition wherein: the molar ratio of formaldehyde to urea and melamine (F:U+M) in the first cook stage is from about 2.0 to about 5.0; the molar ratio of formaldehyde to urea and melamine (F:U+M) in the second cook stage is from about 1.5 to 3.0; and the molar ratio of formaldehyde to urea and melamine (F:U+M) in the final addition from about 0.4 to 0.70.

In still another aspect, the invention is an article of manufacture comprising a substrate and a melamine-urea-formaldehyde resin wherein: the substrate is selected from the group consisting of cellulosic-particles, -strands, -fibers, -veneers, and mixtures thereof; the melamine-urea-formaldehyde resin functions to adhere the substrate together into the article of manufacture; and the melamine-urea-formaldehyde resin is prepared using a method including a first cook stage, a second cook stage, and a final addition wherein: the molar ratio of formaldehyde to urea and melamine (F:U+M) in the first cook stage is from about 2.0 to about 5.0; the molar ratio of formaldehyde to urea and melamine (F:U+M) in the second cook stage is from about 1.5 to 3.0; and the molar ratio of formaldehyde to urea and melamine (F:U+M) in the final addition from about 0.4 to 0.70.

DESCRIPTION OF THE PREFERRED EMBODIMENTS

In one aspect, the invention is a process for preparing a melamine-urea-formaldehyde resin including a first cook stage, a second cook stage, and a final addition For the purposes of this disclosure, the term "cook stage" means stages or periods during a process for preparing a MUF resin during which at least two of the reactants, melamine, urea, and formaldehyde, are being condensed.

In some embodiments, the MUF resins of the disclosure may be prepared using formalin which is, for the purposes of this disclosure, formaldehyde dissolved in water. While any concentration of formaldehyde known to be useful to those skilled in the art of preparing resins to be useful may be used in the formalin, a weight concentration of from about 44 to about 55 percent may be used because of its wide availability. In one embodiment, the formalin will have a concentration of about 35 weight percent. In another embodiment, the formalin will have a concentration of about 50 weight percent.

In other embodiments, the MUF resins of the disclosure may be prepared using formaldehyde in the form of a urea formaldehyde concentrate. This concentrate may include, for example, about 60% formaldehyde and about 25% urea. When higher concentrations of formaldehyde are used, it may be desirable to insure that the formation of paraformaldehyde is avoided.

The melamine used to prepare the MUF resins may be of any grade that is known to be useful to those of ordinary skill in the art of preparing MUF resins. For example, the melamine used with some embodiments of the invention may have a purity of about 99 percent. In some embodiments, the melamine may have a particle size small enough to ensure quick and complete dissolution. For example, in one such embodiment, the melamine may have a particle size of from about 50 to 400 microns.

The MUF resins of the disclosure may be made with urea in some embodiments. The urea used in resin manufacture is handled as white solid granules and the urea used with some embodiments of the invention may have a purity of about 98 percent. The urea useful with the method of the disclosure may be any that is known to be useful to those of ordinary skill in the art of preparing MUF resins.

The MUF resins of the invention have lower ratios of formaldehyde to urea and melamine than resins prepared using conventional urea formaldehyde (UF) and MUF formulations. While not wishing to be bound to any particular theory, it is believed that the reduced formaldehyde ratios result in lower formaldehyde emissions from articles of manufacture prepared using the resins of the disclosure.

As one solution to this problem, it is known to prepare melamine fortified UF resins. MUF resins can provide improved cross-linking and lower formaldehyde emissions at lower formaldehyde ratios [F:(U+M)] without hindering mechanical and physical properties of boards. This solution is not itself without problems. Conventional low formaldehyde formulations of MUF resins may have significantly reduced storage stability compared to conventional formulations. Additionally, lower formaldehyde ratio MUF resins tend to exhibit particularly low usable storage life as the melamine level is increased.

Generally speaking, for conventional MUF resins, the poor stability of low mole ratio resins results in significant viscosity gain that adversely affects resin distribution and results in decreased physical properties, unless resin dosage is dramatically increased. Increasing resin dosage it usually undesirable as this practice may increase costs to fabricators and the increased amounts of resins in products may offset or at least mitigate reductions in formaldehyde emissions. Another aspect of poor stability of conventional low mole ratio MUF resins is precipitation, sedimentation, and creation of two phases, which renders the resins unusable.

In some embodiments of the disclosure, a low formaldehyde MUF resin is prepared using a process for preparing a melamine-urea-formaldehyde resin including a first cook stage and a second cook stage. Two examples of differing embodiments this method are as follows:

| A | B |
|---|---|
| 1) Charge 53% formaldehyde and water. | 1) Charge 53% formaldehyde and water. |
| 2) Adjust pH to 7.0-7.5 with base. | 2) Adjust pH to 7.5-8.0 with base. |
| 3) Charge urea and melamine. | 3) Charge melamine. |
| 4) Heat to 85-90° C. and condense to Gardner viscosity of "D" at pH 7.0-7.5. | 4) Heat to 85-90° C. and condense to Gardner viscosity of "CD~DE" at pH 7.5-8.0. |
| 5) Charge urea and condense further to Gardner viscosity of "C" at 75-80° C. (pH 7.0-7.5). | 5) Charge urea and condense further to Gardner viscosity of "CD~DE" at 75-80° C. (pH 7.5-8.0). |
| 6) Charge urea, water, and sugar. | 6) Charge urea, water, and sugar. |
| 7) Cool to 25° C. and adjust pH to 8.0 with either 50% NaOH or 10% formic acid. | 7) Cool to 25° C. and adjust pH to 8.0 with either 50% NaOH or 10% formic acid. |

These exemplary processes are illustrative but are not intended to limit the scope of the disclosure.

The most significant difference between these two embodiments is that in method "A" the urea addition to the cook steps is divided between the first and second cook stages while in method "B" all of the urea is added in the second cook stage.

The reactants condensed to prepare the polymer portion of the resins of the disclosure may be divided between the two cook stages. The reactants may be divided as follows. From 75 to 100 weight percent of the formaldehyde may be introduced during the first stage and from 0 to 25 weight percent may be introduced during stage 2. From 60 to 100 weight percent of the melamine may be introduced during the first stage and from 0 to 40 weight percent may be introduced during stage 2. Finally, from 0 to 80 weight percent of the urea may be added during the first stage and from 20 to 100 weight percent may be introduced during stage 2.

It should be noted that there may be two types of molar ratios described in this disclosure; "cook" and "final." The cook molar ratio is the ratio of formaldehyde to urea and melamine compounds that is present during a condensation step. Typically, these reactants are, subject to stoichiometric limits, substantially all incorporated into a polymer. The final ratio includes both the reactants that were present during the condensation and any urea and/or melamine compounds that may have been added after the condensation. While these later added compounds may not be immediately incorporated into a polymer backbone, they are present within the resin and may, over time, "cure" into the polymer.

For the purposes of the disclosure, the term cure means to interact with other compounds within a resin to produce a solid thermoset binding material.

The In the practice of the method of the disclosure, the molar ratio of formaldehyde to urea and melamine (F:U+M) in the first cook stage is from about 2.0 to about 5.0. In some embodiments, this ratio may be from about 2.5 to about 4.0. In other embodiment, the ratio may be from about 2.7 to about 3.8.

Also in the practice of the method of the disclosure, the molar ratio of formaldehyde to urea and melamine (F:U+M) in the second cook stage is from about 1.5 to 3.0. In some embodiments, this ratio may be from about 1.8 to about 2.5. In another embodiment, the ratio may be from about 2.0 to about 2.3.

In some embodiments of the invention, there is a final addition of urea, and sometimes water and sugar. Sugar can be added at any stage of the procedure. After this final addition, the molar ratio of formaldehyde to urea and melamine (F:U+M) in the final stage is from about 0.25 to 1.10. In some embodiments, this ratio may be from about 0.33 to about 0.90. In other embodiment, the ratio may be from about 0.4 to about 0.70.

When sugar is used, for example to add stability to a resin, it is preferably sucrose. Sucrose or other commercial sugars may be added at any concentration known to be useful to those of ordinary skill in the art of preparing MUF resins.

Applications

The MUF resins of the disclosure are particularly useful in preparing articles of manufacture where the MUF resins function to bind or adhere substrates together. For example, in one embodiment of the invention, the substrates may be in a form selected from the group consisting of cellulosic-particles, -strands, -fibers, -veneers, and mixtures thereof.

For example, MUF resins of the disclosure may be used as the primary binders used for interior-grade wood composite boards such as particleboard (PB), hardwood plywood (HWP), and medium density fiberboard (MDF). The articles of manufacture may be prepared using any method known to be useful to those of ordinary skill in the art. For example, particleboard may be prepared using the methods disclosed in U.S. Pat. No. 4,482,699 to Williams, the entire contents of which is incorporated herein by reference.

Further, the MUF resins of the disclosure may be prepared including additives useful for their final applications. For example, in one embodiment, the resins may include a mold release agent. Other additives useful with the MUF resins of the disclosure include buffering agents, internal catalysts, tack modifiers, flow modifiers, and fire retardants.

EXAMPLES

The following examples are provided to illustrate the invention. The examples are not intended to limit the scope of the invention and they should not be so interpreted. Amounts are in weight parts or weight percentages unless otherwise indicated.

Example 1

Resins were prepared using either Method A or B above and the components shown below in Table 1. Samples C1 and C2 are comparative examples of traditional urea-formaldehyde resins. These resins as well as a phenol formaldehyde comparative (C3) were tested and their physical properties shown below in Table 2. The resins were stable at 4° C. and 25° C. for periods of 2-3 weeks.

TABLE 1

| | Resins | | | | | |
|---|---|---|---|---|---|---|
| Component | C1[#] | C2[#] | 1-3 | 1-4 | 1-5 | 1-6 |
| Formaldehyde (53%) | 48.45 | 46.65 | 22.90 | 21.95 | 21.00 | 18.75 |
| Water | 0.15 | 0.15 | 5.00 | 6.00 | 6.00 | 6.00 |
| TEA[a] | 0.05 | 0.05 | 0.03 | 0.03 | 0.03 | 0.03 |
| Urea | 24.45 | 23.55 | — | 1.36 | — | — |
| Melamine | — | — | 15.00 | 10.00 | 15.00 | 15.00 |
| Urea | — | — | 3.89 | 4.95 | 3.45 | 2.32 |
| Water | — | — | 12.68 | 12.11 | 12.62 | 14.70 |
| Urea | 26.90 | 29.60 | 37.50 | 40.60 | 38.90 | 40.20 |
| Sugar | — | — | 3.00 | 3.00 | 3.00 | 3.00 |
| Total | 100.0 | 100.0 | 100.0 | 100.0 | 100.0 | 100.0 |

[#]Not an example of the invention,
TEA[a]: triethanolamine

TABLE 2

| | Properties | | | | | |
|---|---|---|---|---|---|---|
| ID | Melamine (%) | Solids content (%) | Viscosity (G)[a] | Final F/(U + M)[b] | Cook F/ (U + M)[b] | pH |
| C1[#] | 0.0 | 64.0 | E | 1.00 | 2.10 | 8.0 |
| C2[#] | 0.0 | 65.0 | E | 0.93 | 2.10 | 8.0 |
| 1-3 | 15.0 | 63.0 | A | 0.50 | 3.40/2.2 | 8.0 |
| 1-4 | 10.0 | 63.0 | A | 0.45 | 3.80/2.1 | 8.0 |
| 1-5 | 15.0 | 63.0 | A | 0.45 | 3.12/2.1 | 8.0 |
| 1-6 | 15.0 | 63.0 | A | 0.40 | 2.78/2.1 | 8.0 |
| C3[#] | 0.0 | 51.0 | G | — | — | 12.0 |

[#]Not an example of the invention,
G[a]: Gardner viscosity,
F/(U + M)[b]: formaldehyde/(urea + melamine) mole ratio

Example 2

Single-layer particleboards were prepared using the resins from Example 1 and dried core-layer western softwoods furnishes. The particleboards were prepared at the conditions set forth in Table 3. The particle board manufacturing procedures are as follows. The wood particles were blended with the resins using a high-speed blender. The blended particles were weighed and hand-felted onto a caul plate within a forming box to obtain homogeneous mats. The mat was pressed in a hot press to reach to the target thickness of 0.68 inch. The finished boards were cooled to room temperature and equilibrated to desired moisture content of 8%. The conditioned boards were trimmed to 12 inch by 12 inch, sanded, and cut for internal bond (IB), modulus of rupture (MOR) and modulus of elasticity (MOE), thickness swelling (TS) and water absorption (WA), and formaldehyde emission (FE) test samples. The sample sizes and testing for IB, MOR and MOE, TS and WA were according to the American Society for Testing and Materials (ASTM) Standard D 1037, Volume 4.09-Wood. The sample size and testing for formaldehyde emission was according to the ASTM D6007-96. Twelve IB specimens and two MOR and MOE samples per condition were tested with a United machine. The results are reported in Table 4.

TABLE 3

Particleboard manufacturing:

Furnish: western softwoods
Furnish MC: 3.7%
Mat moisture contents: 10.5-12.0%
Blending time: 45 sec
Catalyst: 1.0% ammonium sulfate (as 25% solution) based on resin solids
Wax: 0.5% (as 50% solution) based on oven dry wood weight
Resin solids content: 6~11% based on oven dry wood weight
Mat dimensions: 14.625 in × 14.625 in × 0.68 in
Target board density: 47 lb/ft$^3$
Press temperature: 325° F. for an UF resin (C1) and MUF resins (1-3, 1-4, 1-5, 1-6), 345° F. for a PF resin (C3)
Press cycle: 220 and 250 sec for an UF resin (C1), 250 and 290 sec for MUF resins (1-3, 1-4, 1-5, 1-6), 340 and 390 sec for a PF resin (C3)
Testing:

Internal bond strength test: twelve 2" × 2" samples per condition
Thickness swelling and water absorption test: four 2" × 2" samples per condition → soak in water for 24 hrs at 20° C.
Bending test (MOR and MOE): two 2" × 12" samples per condition
Small chamber test: two 2.5" × 5" samples per condition → 7 days conditioning → 24 hr in small chamber → sampling → DNPH formaldehyde test

TABLE 4

| | | | | | Property | | | | | | | |
|---|---|---|---|---|---|---|---|---|---|---|---|---|
| Resin | RT* (%) | PT* (sec) | Density (lb/ft$^3$) | IB* (psi*) | MOR* (psi*) | MOE* (psi*) | TS* (%) | WA* (%) | FE* (ppm*) | F/(U + M)* | M* (%) | S* (%) |
| C3[#] | 6 | 340 | 44.4 | 92 | 1987 | 342200 | 17.4 | 70.3 | 0.039 | — | — | 0.0 |
| | | 390 | 43.8 | 113 | 1642 | 314400 | 17.6 | 80.0 | | | | |
| C1[#] | 7 | 220 | 44.7 | 162 | 2093 | 331000 | 6.8 | 24.7 | 0.139 | 1.00 | 0.0 | 0.0 |
| | | 250 | 44.7 | 157 | 2182 | 317300 | 6.7 | 25.4 | | | | |
| 1-3 | 11 | 250 | 46.6 | 151 | 2136 | 385600 | 8.1 | 26.6 | 0.011 | 0.50 | 15.0 | 3.0 |
| | | 290 | 46.4 | 154 | 1994 | 358500 | 8.1 | 26 | | | | |
| 1-4 | 11 | 250 | 47.8 | 117 | 1970 | 403500 | 13.2 | 35.4 | 0.011 | 0.45 | 10.0 | 3.0 |
| | | 290 | 45.5 | 107 | 1795 | 334100 | 12.1 | 36.1 | | | | |

TABLE 4-continued

| Resin | RT* (%) | PT* (sec) | Density (lb/ft³) | IB* (psi*) | MOR* (psi*) | MOE* (psi*) | TS* (%) | WA* (%) | FE* (ppm*) | F/(U + M)* | M* (%) | S* (%) |
|---|---|---|---|---|---|---|---|---|---|---|---|---|
| 1-5 | 11 | 250 | 48.4 | 152 | 2508 | 418200 | 8.4 | 27.1 | 0.009 | 0.45 | 15.0 | 3.0 |
|  |  | 290 | 47.6 | 159 | 2185 | 394100 | 9.2 | 27.8 |  |  |  |  |
| 1-6 | 11 | 250 | 48.4 | 116 | 1954 | 375000 | 10.4 | 30.6 | 0.009 | 0.40 | 15.0 | 3.0 |
|  |  | 290 | 46.7 | 116 | 1833 | 351700 | 11.6 | 32.4 |  |  |  |  |

*RT: Resin Treatment, PT: Press Time, IB: Internal Bond, MOR and MOE: Modulus Of Rupture and Modulus Of Elasticity, TS and WA: Thickness Swelling and Water Absorption, FE: Formaldehyde Emission by small chamber method, F/(U + M): Formaldehyde/(Urea + Melamine) mole ratio, psi: pound per square inch, ppm: part per million, M: melamine, S: sugar
Not an example of the invention.

Example 3

Medium density fiberboards (MDF) were prepared using the resins from Example 1 and dried mixed pine fibers. The medium density fiberboards were prepared at the conditions set forth in Table 5. The detail MDF manufacturing procedures are as follows. The wood fibers were blended with the resins using a fiber-blender. The resinated fibers were weighed and air-felted onto a forming box to obtain homogeneous mats. The mat was pressed in a hot press to reach to the target thickness of 0.68 inch. The finished boards were cooled to room temperature and equilibrated to desired moisture content of 8%. The sample sizes and testing of IB, MOR and MOE, TS and WA, and FE were the same as described in Example 2. The results are reported in Table 6.

TABLE 5

Medium-density fiberboard manufacturing:

Furnish: mixed pine
Furnish MC: 8.8%
Mat moisture contents: 8-9%
Blending time: 20-25 min
Catalyst: 1% (as 25% solution) based on resin solids
Wax: 0.5% (as 50% solution) based on oven dry wood weight
Resin solids content: 6%~16% based on oven dry wood weight
Mat dimensions: 14.625 in × 14.625 in × 0.68 in
Target board density: 47 lb/ft³
Press temperature: 325° F. for an UF resin (C2) and MUF resins (1-3, 1-4, 1-5, 1-6), 345° F. for a PF resin (C3)

TABLE 5-continued

Press time: 220 and 250 sec for an UF resin (C2), 250 and 290 sec for MUF resins (1-3, 1-4, 1-5, 1-6), 340 and 390 sec for a PF resin (C3)
Testing:

Internal bond strength test: twelve 2" × 2" samples per press cycle
Bending test (MOR and MOE): two 2" × 12" samples per press cycle
Thickness swelling and water absorption test: four 2" × 2" samples per press cycle → soak in water for 24 hr at 20° C.
Small chamber test: two 2.5" × 5" samples per condition → 7 days conditioning → 24 hr in small chamber → sampling → DNPH formaldehyde test

TABLE 6

| Resin | RT* (%) | PT* (sec) | Density (lb/ft³) | IB* (psi*) | MOR* (psi*) | MOE* (psi*) | TS* (%) | WA* (%) | FE* (ppm*) | F/(U + M)* | M* (%) | S* (%) |
|---|---|---|---|---|---|---|---|---|---|---|---|---|
| C3# | 9 | 340 | 48.8 | 70 | 4541 | 405300 | 8.7 | 70.3 | 0.031 | — | — | 0.0 |
|  |  | 390 | 48.8 | 74 | 4372 | 395800 | 8.3 | 80.0 |  |  |  |  |
| C2# | 9 | 220 | 47.7 | 124 | 4280 | 368700 | 7.6 | 24.7 | 0.129 | 1.00 | 0.0 | 0.0 |
|  |  | 250 | 47.9 | 128 | 3991 | 337800 | 7.8 | 25.4 |  |  |  |  |
| 1-3 | 16 | 250 | 49.9 | 139 | 4640 | 446700 | 6.5 | 26.6 | 0.01 | 0.50 | 15.0 | 3.0 |
|  |  | 290 | 48.3 | 138 | 4402 | 412300 | 6.5 | 26.0 |  |  |  |  |
| 1-4 | 16 | 250 | 49.2 | 98 | 3794 | 401600 | 7.9 | 35.4 | 0.011 | 0.45 | 10.0 | 3.0 |
|  |  | 290 | 48.8 | 105 | 3956 | 412500 | 7.9 | 36.1 |  |  |  |  |
| 1-5 | 16 | 250 | 50.7 | 126 | 4403 | 434200 | 6.7 | 27.1 | 0.007 | 0.45 | 15.0 | 3.0 |
|  |  | 290 | 47.9 | 109 | 4042 | 393400 | 7.4 | 27.8 |  |  |  |  |
| 1-6 | 16 | 250 | 49.6 | 87 | 3871 | 421700 | 8.2 | 30.6 | 0.009 | 0.40 | 15.0 | 3.0 |
|  |  | 290 | 47.7 | 98 | 3960 | 428600 | 8.6 | 32.4 |  |  |  |  |

*RT: Resin Treatment, PT: Press Time, IB: Internal Bond, MOR and MOE: Modulus Of Rupture and Modulus Of Elasticity, TS and WA: Thickness Swelling and Water Absorption, FE: Formaldehyde Emission by small chamber method, F/(U + M): Formaldehyde/(Urea + Melamine) mole ratio, psi: pound per square inch, ppm: part per million, M: melamine, S: sugar
Not an example of the invention.

DISCUSSION OF THE EXAMPLES

The results from the particle board and fiber board testing show that the samples of the invention have good physical properties and low formaldehyde emissions as compared to the boards produced with conventional resins.

What is claimed is:

1. A method for preparing a melamine-urea-formaldehyde resin comprising a first cook stage, a second cook stage, and a final addition wherein:
    the first cook stage comprises adding at least formaldehyde and melamine to form a first cook stage molar ratio of formaldehyde to urea and melamine (F:U+M) from about 2.0 to about 5.0;
    the second cook stage comprises adding at least urea to form a second cook stage molar ratio of formaldehyde to urea and melamine (F:U+M) from about 1.5 to 3.0; and the final addition comprises adding at least urea to form a final addition molar ratio of formaldehyde to urea and melamine (F:U+M) from about 0.4 to 0.7.

2. The method of claim 1 wherein the melamine-urea-formaldehyde resin is prepared using formalin.

3. The method of claim 2 wherein the formalin has a formaldehyde concentration of from about 44 to 55 weight percent.

4. The method of claim 1 wherein the melamine-urea-formaldehyde resin is prepared using a urea formaldehyde concentrate.

5. The method of claim 4 wherein the urea formaldehyde concentrate has a formaldehyde concentration of about 60 weight percent and a urea concentration of about 25 weight percent.

6. The method of claim 5 wherein the melamine-urea-formaldehyde resin is prepared using melamine having a particle size of from about 50 to about 400 microns.

7. The method of claim 1 wherein urea is added in the first cook stage and the urea of the first and second cooks stages is divided between the first and second cook stages.

8. The method of claim 1 wherein all of the urea of the first and second cook stages is added in the second cook stage.

9. The method of claim 1 wherein from 75 to 100 weight percent of the formaldehyde added during the first and second cook stages is added during the first cook stage.

10. The method of claim 1 wherein from 60 to 100 weight percent of the melamine added during the first and second cook stages is added during the first cook stage.

11. The method of claim 1 wherein from 0 to 80 weight percent of the urea added during the first and second cook stages is added during the first cook stage.

12. A method for preparing a melamine-urea-formaldehyde resin comprising:
charging formaldehyde and melamine to form a mixture at a first molar ratio of formaldehyde to urea and melamine (F:U+M) from about 2.0 to about 5.0 and then heating the mixture;
charging a first amount of urea to the mixture to form a second molar ratio of formaldehyde to urea and melamine (F:U+M) from about 1.5 to 3.0 and heating the mixture; and
charging a second amount of urea to the mixture to form a third molar ratio of formaldehyde to urea and melamine (F:U+M) from about 0.25 to 1.1.

13. The method of claim 12, further comprising charging urea with the formaldehyde and melamine to form the mixture.

14. The method of claim 13, wherein from 75 to 100 weight percent of the formaldehyde, from 60 to 100 weight percent of the melamine and from 0 to 80 weight percent of the urea is added to form the mixture.

15. The method of claim 12, wherein the first molar ratio of formaldehyde to urea and melamine (F:U+M) is from about 2.5 to about 5.0 and the second molar ratio of formaldehyde to urea and melamine (F:U+M) is from about 1.5 to 2.3.

16. The method of claim 12, wherein the first molar ratio of formaldehyde to urea and melamine (F:U+M) is from 2.5 to about 5.0 and the second molar ratio of formaldehyde to urea and melamine (F:U+M) is from about 1.5 to less than 2.5.

17. The method of claim 1, wherein the first cook stage molar ratio of formaldehyde to urea and melamine (F:U+M) is from about 2.5 to about 5.0 and the second cook stage molar ratio of formaldehyde to urea and melamine (F:U+M) is from about 1.5 to 2.3.

18. The method of claim 1, wherein the first cook stage molar ratio of formaldehyde to urea and melamine (F:U+M) is from 2.5 to about 5.0 and the second cook stage molar ratio of formaldehyde to urea and melamine (F:U+M) is from about 1.5 to less than 2.5.

19. The method of claim 1, wherein the second cook stage further comprises adding formaldehyde, melamine, or both.

20. The method of claim 1, wherein the charging the second amount of urea to the mixture comprises charging urea to form a third molar ratio of formaldehyde to urea and melamine (F:U+M) from about 0.33 to about 0.9.

21. A melamine-urea-formaldehyde resin prepared using a method comprising a first cook stage, a second cook stage, and a final addition wherein:
the first cook stage comprises adding at least formaldehyde and melamine to form a first cook stage molar ratio of formaldehyde to urea and melamine (F:U+M) from about 2.0 to about 5.0;
the second cook stage comprises adding at least urea to form a second cook stage molar ratio of formaldehyde to urea and melamine (F:U+M) from about 1.5 to 3.0; and
final addition comprises adding at least urea to form a final addition molar ratio of formaldehyde to urea and melamine (F:U+M) from about 0.4 to 0.7.

22. The melamine-urea-formaldehyde resin of claim 21 wherein the resin is prepared using a formulation further comprising sugar.

23. The melamine-urea-formaldehyde resin of claim 21 further comprising an additive selected from the group consisting of: a mold release agent; a buffering agent; an internal catalyst; a tack modifier; a flow modifier; a fire retardant; and combinations thereof.

24. An article of manufacture comprising a substrate and a melamine-urea-formaldehyde resin wherein:
the substrate is selected from the group consisting of cellulosic-particles, -strands, -fibers, -veneers, and mixtures thereof; the melamine-urea-formaldehyde resin functions to adhere the substrate together into the article of manufacture; and
the melamine-urea-formaldehyde resin is prepared using a method comprising a first cook stage, a second cook stage, and a final addition wherein:
the first cook stage comprises adding at least formaldehyde and melamine to form a first cook stage molar ratio of formaldehyde to urea and melamine (F:U+M) from about 2.0 to about 5.0;
the second cook stage comprises adding at least urea to foam a second cook stage molar ratio of formaldehyde to urea and melamine (F:U+M) from about 1.5 to 3.0; and
the final addition comprises adding at least urea to form a final addition molar ratio of formaldehyde to urea and melamine (F:U+M) from about 0.4 to 0.7.

25. The article of manufacture of claim 24 wherein the article of manufacture is particleboard, hardwood plywood, or medium density fiberboard.

26. The article of manufacture of claim 24 wherein the article of manufacture is particle board.

* * * * *

UNITED STATES PATENT AND TRADEMARK OFFICE
CERTIFICATE OF CORRECTION

PATENT NO. : 8,088,881 B2  
APPLICATION NO. : 12/145871  
DATED : January 3, 2012  
INVENTOR(S) : Byung Young No et al.

Page 1 of 1

It is certified that error appears in the above-identified patent and that said Letters Patent is hereby corrected as shown below:

Column 1, line 11, the portion of the line reading "resins that are have", should be changed to -resins that have-.

Column 3, line 11, the portion of the line reading "Increasing resin dosage it usually undesirable", should be changed to -Increasing resin dosage is usually undesirable-.

Claim 20, line 1, "claim 1" should be changed to -claim 12-.

Claim 24, line 16, "foam" should be changed to -form-.

Signed and Sealed this  
Seventeenth Day of April, 2012

David J. Kappos  
*Director of the United States Patent and Trademark Office*

UNITED STATES PATENT AND TRADEMARK OFFICE
CERTIFICATE OF CORRECTION

PATENT NO. : 8,088,881 B2
APPLICATION NO. : 12/145871
DATED : January 3, 2012
INVENTOR(S) : Byung Young No et al.

It is certified that error appears in the above-identified patent and that said Letters Patent is hereby corrected as shown below:

Column 1, line 11, the portion of the line reading "resins that are have", should be changed to -resins that have-.

Column 3, line 11, the portion of the line reading "Increasing resin dosage it usually undesirable", should be changed to -Increasing resin dosage is usually undesirable-.

Column 10, line 11 (Claim 20, line 1) "claim 1" should be changed to -claim 12-.

Column 10, line 51 (Claim 24, line 16) "foam" should be changed to -form-.

This certificate supersedes the Certificate of Correction issued April 17, 2012.

Signed and Sealed this
Eighth Day of May, 2012

David J. Kappos
*Director of the United States Patent and Trademark Office*